United States Patent
Ozaki

(10) Patent No.: US 7,739,009 B2
(45) Date of Patent: Jun. 15, 2010

(54) IN-VEHICLE ELECTRONIC SYSTEM AND IN-VEHICLE ELECTRONIC APPARATUS

(75) Inventor: Yukisuke Ozaki, Kobe (JP)

(73) Assignee: Fujitsu Ten Limited, Kobe-shi (JP)

( * ) Notice: Subject to any disclaimer, the term of this patent is extended or adjusted under 35 U.S.C. 154(b) by 749 days.

(21) Appl. No.: 11/645,642

(22) Filed: Dec. 27, 2006

(65) Prior Publication Data

US 2008/0133083 A1    Jun. 5, 2008

(30) Foreign Application Priority Data

Dec. 4, 2006  (JP) ............................. 2006-327664

(51) Int. Cl.
*G06F 7/00* (2006.01)
(52) U.S. Cl. ..................... 701/36; 701/200; 307/10.1
(58) Field of Classification Search .................. 701/36, 701/200–202, 211; 340/995.2; 307/10.1, 307/9.1
See application file for complete search history.

(56) References Cited

U.S. PATENT DOCUMENTS

| | | | |
|---|---|---|---|
| 4,178,319 A | 12/1979 | Chattha | |
| 4,389,639 A | 6/1983 | Torii et al. | |
| 4,542,421 A | 9/1985 | Fujibayashi | |
| 5,493,479 A | 2/1996 | Takahashi | |
| 5,510,957 A | 4/1996 | Takagi | |
| 5,537,673 A | 7/1996 | Nagashima et al. | |
| 5,592,389 A | 1/1997 | La Rue et al. | |
| 5,627,547 A | 5/1997 | Ramaswamy et al. | |
| 5,705,975 A | 1/1998 | Serino et al. | |
| 5,733,714 A | 3/1998 | McCulloch et al. | |
| 5,774,828 A | 6/1998 | Brunts et al. | |
| 5,794,164 A | 8/1998 | Beckert et al. | |
| 5,845,282 A | 12/1998 | Alley et al. | |
| 5,862,468 A | 1/1999 | Kim | |
| 5,917,435 A | 6/1999 | Kamiya et al. | |
| 5,941,933 A | 8/1999 | Miyake et al. | |
| 5,964,821 A | 10/1999 | Brunts et al. | |
| 5,999,126 A | 12/1999 | Ito | |
| 6,009,355 A | 12/1999 | Obradovich et al. | |
| 6,023,290 A | 2/2000 | Seita | |

(Continued)

FOREIGN PATENT DOCUMENTS

DE    198 03 178 A1    7/1999

(Continued)

OTHER PUBLICATIONS

U.S. Appl. No. 11/645,629, filed Dec. 27, 2006.

(Continued)

*Primary Examiner*—Yonel Beaulieu
(74) *Attorney, Agent, or Firm*—Oliff & Berridge, PLC

(57) ABSTRACT

The present invention provides an in-vehicle electronic system including: an in-vehicle electronic apparatus mounted in a vehicles and a portable electronic apparatus detachably provided to the in-vehicle electronic apparatus, and the in-vehicle electronic apparatus includes: a detecting portion detecting a connection of the portable electronic apparatus; and a first controller requesting the portable electronic apparatus to display display information of the portable electronic apparatus on a display portion of the portable electronic apparatus, when detecting a connection of the portable electronic apparatus.

7 Claims, 10 Drawing Sheets

U.S. PATENT DOCUMENTS

| | | | |
|---|---|---|---|
| 6,055,478 | A | 4/2000 | Heron |
| 6,091,956 | A | 7/2000 | Hollenberg |
| 6,093,977 | A | 7/2000 | Fujita et al. |
| 6,119,060 | A | 9/2000 | Takayama et al. |
| 6,125,326 | A | 9/2000 | Ohmura et al. |
| 6,136,507 | A | 10/2000 | Morigaki |
| 6,148,253 | A | 11/2000 | Taguchi et al. |
| 6,150,925 | A | 11/2000 | Casazza |
| 6,163,079 | A | 12/2000 | Miyazaki et al. |
| 6,202,008 | B1 | 3/2001 | Beckert et al. |
| 6,208,932 | B1 | 3/2001 | Ohmura et al. |
| 6,243,645 | B1 | 6/2001 | Moteki et al. |
| 6,303,266 | B1 | 10/2001 | Okino et al. |
| 6,405,049 | B2 | 6/2002 | Herrod et al. |
| 6,417,786 | B2 | 7/2002 | Learman et al. |
| 6,421,606 | B1 | 7/2002 | Asai et al. |
| 6,653,049 | B2 | 11/2003 | Pavelchek et al. |
| 6,681,176 | B2 | 1/2004 | Funk et al. |
| 6,701,161 | B1 | 3/2004 | Wendling |
| 6,791,844 | B2 | 9/2004 | Tobishima et al. |
| 6,803,168 | B1 | 10/2004 | Padmanaban et al. |
| 6,816,783 | B2 | 11/2004 | Hashima et al. |
| 6,993,615 | B2 | 1/2006 | Falcon |
| 7,006,845 | B2 | 2/2006 | Simon |
| 7,016,986 | B2 | 3/2006 | Fasolt |
| 7,062,378 | B2 | 6/2006 | Krull et al. |
| 7,079,863 | B2 | 7/2006 | Chikaishi |
| 7,117,286 | B2 | 10/2006 | Falcon |
| 7,184,003 | B2 | 2/2007 | Cupps et al. |
| 7,215,950 | B2 | 5/2007 | Mazzara, Jr. et al. |
| 7,216,242 | B2 | 5/2007 | Glass et al. |
| 7,222,207 | B2 | 5/2007 | Falcon |
| 7,684,200 | B2 * | 3/2010 | Watanabe et al. ............ 361/727 |
| 2001/0018663 | A1 | 8/2001 | Dussell et al. |
| 2002/0024597 | A1 | 2/2002 | Arai et al. |
| 2002/0068549 | A1 | 6/2002 | Tendler |
| 2002/0137541 | A1 | 9/2002 | Lepley et al. |
| 2002/0152027 | A1 | 10/2002 | Allen |
| 2003/0022624 | A1 | 1/2003 | Sato |
| 2003/0103634 | A1 | 6/2003 | Ito |
| 2003/0215736 | A1 | 11/2003 | Oberlander et al. |
| 2004/0058656 | A1 | 3/2004 | Chikaishi |
| 2004/0204159 | A1 | 10/2004 | Van Bosch |
| 2004/0247280 | A1 | 12/2004 | Izawa |
| 2005/0139731 | A1 | 6/2005 | Park et al. |
| 2006/0031617 | A1 | 2/2006 | Falcon |
| 2006/0211256 | A1 | 9/2006 | Takei et al. |
| 2008/0130206 | A1 | 6/2008 | Itoh |
| 2008/0161047 | A1 | 7/2008 | Witkowski et al. |

FOREIGN PATENT DOCUMENTS

| | | |
|---|---|---|
| EP | 0 507 990 A1 | 10/1992 |
| EP | 0 580 157 A1 | 1/1994 |
| EP | 0 658 011 A | 6/1995 |
| EP | 1 251 034 A2 | 10/2002 |
| EP | 1 727 019 A1 | 11/2006 |
| GB | 2 287 501 A | 9/1995 |
| GB | 2 336 489 A | 10/1999 |
| JP | U-57-204770 | 6/1956 |
| JP | Y-63-018184 | 5/1988 |
| JP | A 04-238218 | 8/1992 |
| JP | A 07-074479 | 3/1995 |
| JP | A-07-132779 | 5/1995 |
| JP | A-07-156719 | 6/1995 |
| JP | A 08-007977 | 1/1996 |
| JP | A 08-260794 | 10/1996 |
| JP | 08-318792 | 12/1996 |
| JP | A 08-318792 | 12/1996 |
| JP | A 10-16654 | 1/1998 |
| JP | A 10-103999 | 4/1998 |
| JP | A 10-135669 | 5/1998 |
| JP | A 10-199220 | 7/1998 |
| JP | A 11-289173 | 10/1999 |
| JP | 2000-311029 A | 11/2000 |
| JP | A 2001-015936 | 1/2001 |
| JP | A-2001-052473 | 2/2001 |
| JP | 2001-141471 A | 5/2001 |
| JP | A 2001-239895 | 9/2001 |
| JP | KR-A-10-2001-0112146 | 12/2001 |
| JP | A-2002-74922 | 3/2002 |
| JP | A-2002-181555 | 6/2002 |
| JP | A-2002-267461 | 9/2002 |
| JP | A 2002-328026 | 11/2002 |
| JP | 2003-037514 A | 2/2003 |
| JP | A 2003-035554 | 2/2003 |
| JP | A 2003-166848 | 6/2003 |
| JP | A 2003-521825 | 7/2003 |
| JP | A-2003-308686 | 10/2003 |
| JP | 2003-315065 A | 11/2003 |
| JP | A 2004-234794 | 8/2004 |
| JP | 2005-173653 A | 6/2005 |
| JP | A 2005-524570 | 8/2005 |
| JP | A-2005-284886 | 10/2005 |
| KR | 2003-0014769 | 2/2003 |
| KR | 10-2003-0071743 A | 9/2003 |
| KR | 10-2004-0061642 A | 7/2004 |
| KR | 20-0372059 Y1 | 1/2005 |
| KR | 10-2005-0017296 A | 2/2005 |
| KR | 10-2005-0072425 A | 7/2005 |
| KR | 10-2006-0030344 A | 4/2006 |
| KR | 2006-128470 A | 12/2006 |
| WO | WO 95/19030 A1 | 7/1995 |
| WO | WO 98/39852 | 9/1998 |
| WO | WO 99/38728 | 8/1999 |
| WO | WO-2004/092840 A1 | 10/2004 |
| WO | WO 2006/130784 A2 | 12/2006 |

OTHER PUBLICATIONS

U.S. Appl. No. 11/645,628, filed Dec. 27, 2006.
U.S. Appl. No. 11/646,539, filed Dec. 28, 2006.
U.S. Appl. No. 11/646,477, filed Dec. 28, 2006.
U.S. Appl. No. 11/646,566, filed Dec. 28, 2006.
U.S. Appl. No. 11/645,672, filed Dec. 27, 2006.
U.S. Appl. No. 11/646,557, filed Dec. 28, 2006.
U.S. Appl. No. 11/646,478, filed Dec. 28, 2006.
U.S. Appl. No. 11/646,558, filed Dec. 28, 2006.
U.S. Appl. No. 11/646,498, filed Dec. 28, 2006.
U.S. Appl. No. 11/646,538, filed Dec. 28, 2006.
U.S. Appl. No. 11/646,479, filed Dec. 28, 2006.
M. Mukasa. "Detachable-Panel Connectors Respond to Needs for Anti-Theft Designs," JEE Journal of Electronic Engineering Feb. 30, 1993, No. 314, Tokyo, Japan.
Jan. 5, 2010 Office Action issued in U.S. Appl. No. 11/646,498.
Oct. 1, 2009 European Search Report issued in European Application No. EP 07 12 2201.2.
European Search Report dated Sep. 17, 2009—Application No. EP 07 12 2206.1.

* cited by examiner

IN-VEHICLE ELECTRONIC SYSTEM AND IN-VEHICLE ELECTRONIC APPARATUS

BACKGROUND OF THE INVENTION

1. Field of the Invention

This invention relates to an in-vehicle electronic apparatus in which a portable electronic apparatus is detachably provided.

2. Description of the Related Art

As conventional navigation apparatuses, there are widely known small-sized portable navigation apparatuses with simplified structure and portability, also known as Personal Navigation Device (hereinafter, referred to as PND); and in-vehicle navigation apparatuses accommodated and fixed in a recess portion (DIN opening) formed in a dashboard of a vehicle. The in-vehicle navigation apparatuses are capable of guiding with high accuracy by use of the information supplied from vehicles such as vehicle speed, and some of the in-vehicle navigation apparatuses are equipped with audio devices.

In recent years, there have been proposed an audio navigation system with both portability of the PND type navigation apparatus and high-accuracy guide function of the in-vehicle navigation apparatus. This audio navigation system is provided with an audio portion and a navigation portion, and the main body thereof is accommodated and fixed in the DIN opening of the vehicle. However, the navigation portion is removable from the audio portion. The removed navigation portion is configured such that the power supply is equipped therein and the navigation is enabled with the navigation portion removed.

Accordingly, in the audio navigation system equipped with the detachable navigation portion, how to improve the user friendliness remains to be solved.

Japanese Patent Application Publication No. 2003-35554 is an invention relating to the portable type navigation apparatus that can be detached from a vehicle. There are provided an in-vehicle unit mounted in a vehicle and storing and retaining map information, and a portable unit detachably mounted in the in-vehicle unit and acquiring a portion of the map information from the in-vehicle unit at every given timing. It is disclosed that when the portable unit is detached from the in-vehicle unit, the acquired map information is displayed on the portable unit.

However, in a system in which the navigation apparatus is detachable from the audio apparatus, there is still room for improvement of user-friendliness.

SUMMARY OF THE INVENTION

The present invention has been made in view of the above circumstances and provides an in-vehicle electronic system and an in-vehicle electronic apparatus, with which user-friendliness is improved in that the display can be changed according to user's feelings in a system where the portable electronic apparatus can be detached from the in-vehicle electronic apparatus.

According to an aspect of the present invention, there is provided an in-vehicle electronic system including: an in-vehicle electronic apparatus mounted in a vehicle; and a portable electronic apparatus detachably provided to the in-vehicle electronic apparatus, and the in-vehicle electronic apparatus includes: a detecting portion detecting a connection of the portable electronic apparatus; and a first controller requesting the portable electronic apparatus to display display information of the portable electronic apparatus on a display portion of the portable electronic apparatus, when detecting a connection of the portable electronic apparatus. Therefore, a user who uses the portable electronic apparatus is able to operate the portable electronic apparatus immediately after getting in a vehicle, whereby user-friendliness can be improved.

According to another aspect of the present invention, there is provided an in-vehicle electronic apparatus mounted in a vehicle and detachably provided with a portable electronic apparatus, and the in-vehicle electronic apparatus includes: a detecting portion detecting a connection of the portable electronic apparatus; and a first controller causing display information of the portable electronic apparatus to be displayed on a display portion of the portable electronic apparatus. Therefore, a user who uses the portable electronic apparatus is able to operate the portable electronic apparatus immediately after getting in a vehicle, whereby user-friendliness can be improved.

BRIEF DESCRIPTION OF THE DRAWINGS

Exemplary embodiments of the present invention will be described in detail with reference to the following drawings, wherein.

DESCRIPTION OF THE PREFERRED EMBODIMENTS

A description will now be given, with reference to the accompanying drawings, of exemplary embodiments of the present invention.

Embodiment

Figure 1:
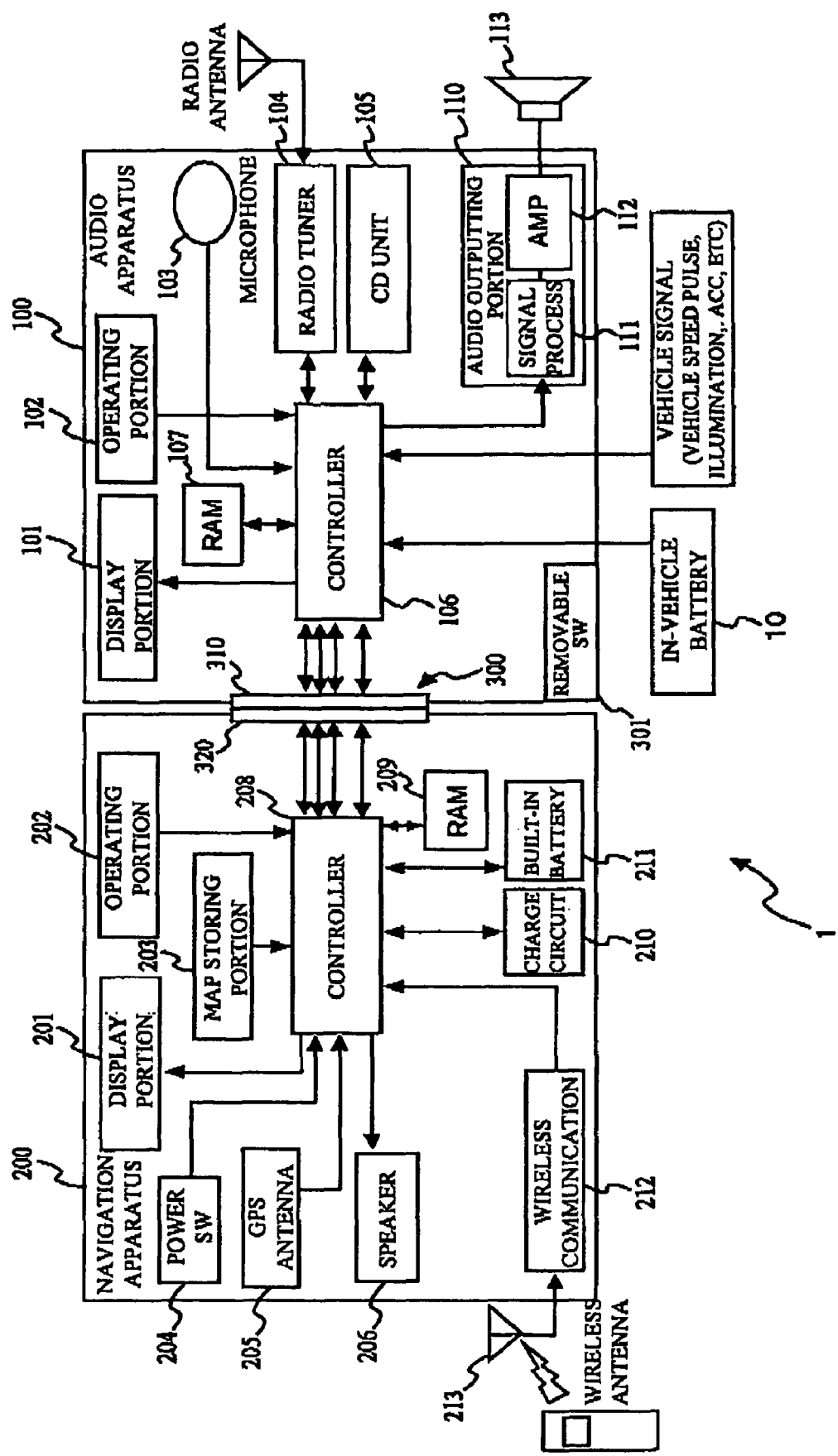
FIG. 1 is a view showing a configuration of an audio navigation system.

FIG. 1 is a view showing a configuration of an audio and navigation system 1.

The audio and navigation system 1 employed in the present exemplary embodiment includes: an audio apparatus 100 mounted in a vehicle; and a navigation apparatus 200 detachably provided in the audio apparatus 100. The navigation apparatus 200 is connected to the audio apparatus 100 by a connector portion 300.

Figure 2A:
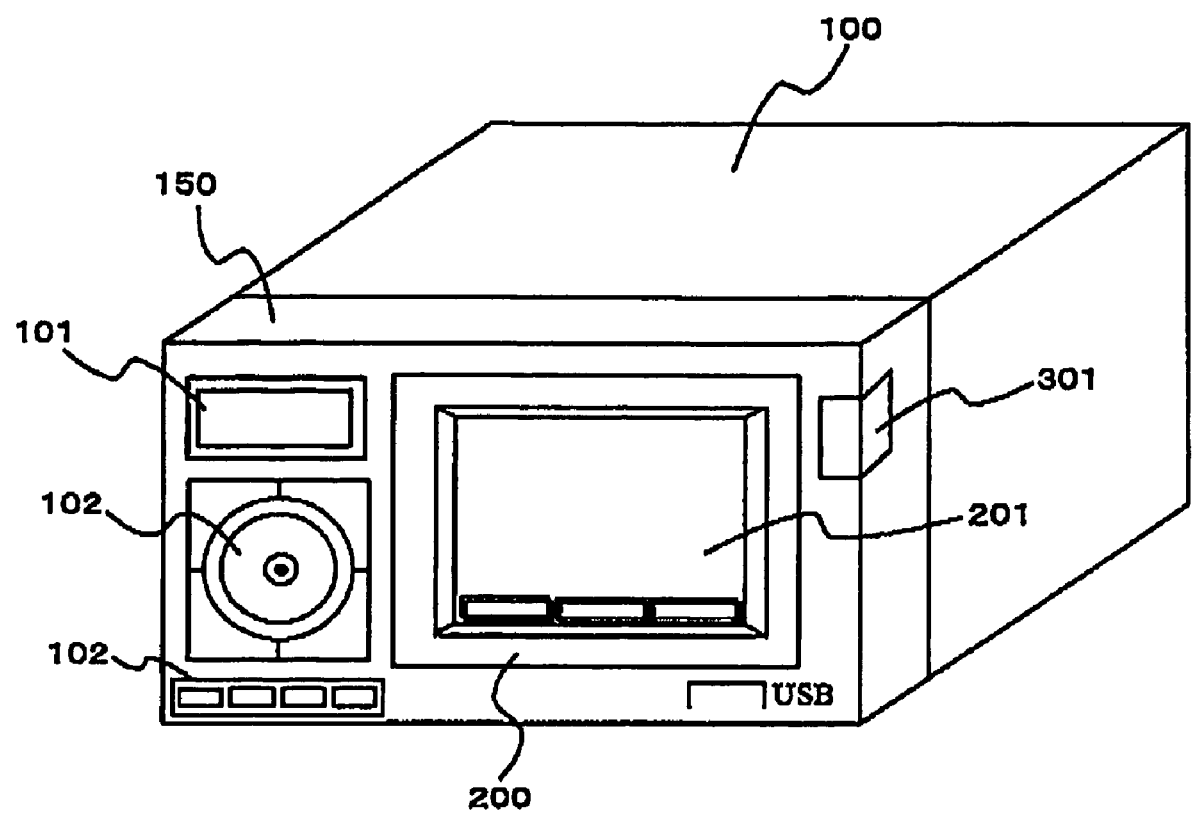
FIG. 2A shows an exterior shape of the audio navigation system.
Figure 2B:
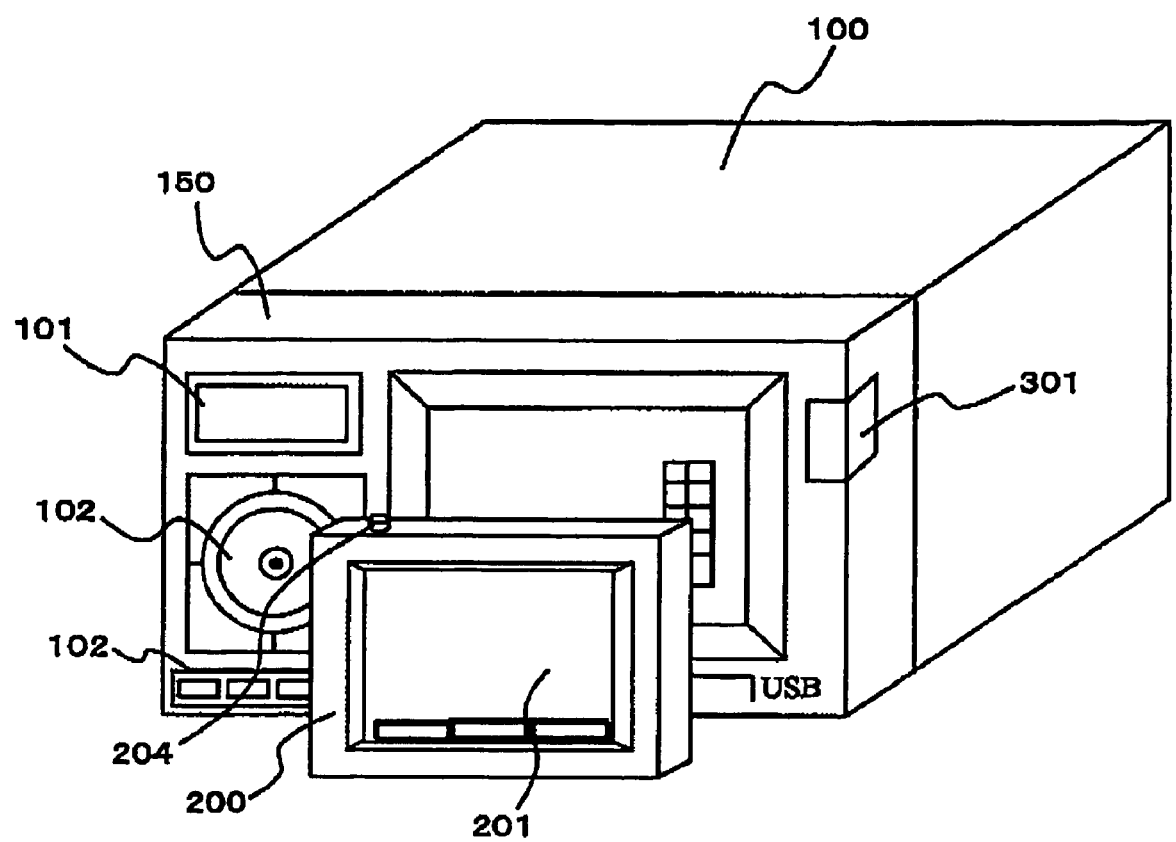
FIG. 2B is a view showing a navigation apparatus taken out of an audio apparatus.

FIG. 2A shows an exterior shape of the audio and navigation system 1. The navigation apparatus 200 is fitted to a front face panel 150 of the audio apparatus 100. Also, the navigation apparatus 200 can be taken out of the audio apparatus 100 as shown in FIG. 2B and used alone as a single unit. The front face panel 150 of the audio apparatus 100 is provided with: in addition to the navigation apparatus 200; a display portion 101; an operating portion 102 operable the audio apparatus 100; and the like. The operating portion 102 is provided with, for example, an operation button, push button, cross key, enter key, TITL (eject button), and the like, and in addition, the operating portion 102 is also provided with a screen button 122 (this button will be described later) that can change the display of a display portion 201.

Figure 3:
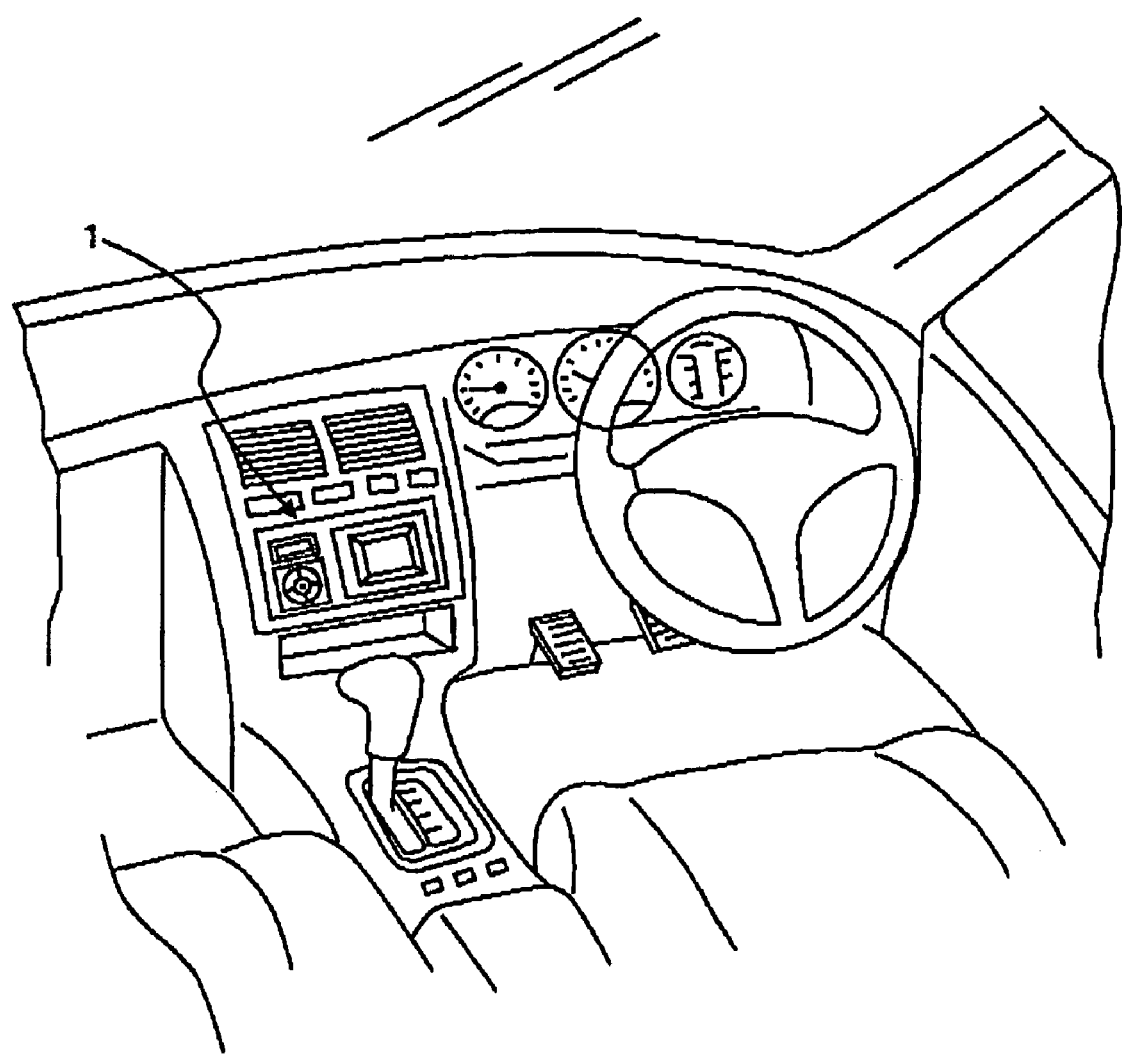
FIG. 3 is a view showing the audio navigation system accommodated in a 2DIN opening of a vehicle.

The audio and navigation system 1 shown in FIG. 2A is accommodated and fixed in a 2DIN opening of a vehicle, as shown in FIG. 3.

Referring back to FIG. 1, a description will be given of a configuration of each of components. The audio apparatus 100 is provided with: the display portion 101; the operating portion 102; a microphone 103, a radio tuner 104; a CD (Compact Disk) unit 105; a controller 106; a RAM (Random Access Memory) 107; and an audio outputting portion 110.

The display portion 101 of the audio apparatus 100 is capable of displaying music information, play time, and the like. With the operating portion 102, it is possible to operate the CD unit 105 or the radio tuner 104 for selecting a song to be played by the audio apparatus 100, a broadcast program to be received, or the like.

The radio tuner 104 and the CD unit 105 are audio sources, and in addition, an MD (Mini Disk) unit or a cassette recorder may be provided. When any of the radio tuner 104 and the CD unit 105 is selected by the operating portion 102 as an operation target, the controller 106 outputs a signal fed by the selected audio source, to the audio outputting portion 110.

The audio outputting portion 110 is provided with: a signal processor 111 that processes a signal sent from the controller 106; and an amplifier 112 that amplifies a signal. The signal amplified by the amplifier 112 is output from a speaker 113 connected.

The controller 106 reads a program or the like stored in the RAM 107, and controls each part of the audio apparatus 100.

The microphone 103 is a hands-free type, and is provided in the audio apparatus 100. The controller 106 outputs the audio input from the microphone through a connector 310 to a wireless communication sender/receiver 212 of the navigation apparatus 200 to send to communications equipment of an apparatus to be communicated with.

In addition, the controller 106 controls the supply of the power supplied from an in-vehicle battery 10 mounted in a vehicle, to the navigation apparatus 200.

Further, the controller 106 is fed with a vehicle speed pulse, an illumination power signal, ACC (accessory power) signal, or the like, and performs processing according to the signal. The vehicle speed pulse is output to a controller 208 of the navigation apparatus 200 from the controller 106.

The navigation apparatus 200 includes: the display portion 201; an operating portion 202: a map storage portion 203; a power switch 204: a GPS (Global Positioning System) antenna 205; a speaker 206; the controller 209; a RAM 209; a charge circuit 210; a built-in battery 211; the wireless communication sender/receiver 212; and a wireless antenna 213.

The GPS antenna 205 receives a GPS signal from a satellite, and the GPS signal received by the GPS antenna 205 is output to the controller 208. The controller 208 determines the position of the vehicle based on the GPS signal fed by the satellite (GPS navigation).

The map storage portion 203 stores map data, and the map data read from the map storage portion 203 is decoded by a decoder (not shown). The decoder is connected to the controller 208, and the controller 208 performs a so-called map matching process that matches the vehicle position determined with the map data. By the map matching process, map image data is to be created such that the vehicle position is indicated with accuracy. Such created map image data is displayed on the display portion (main display) 201 by the control of the controller 20B.

Also, an operation signal applied from the operating portion 202 is input into the controller 208, and then the processing is performed by the controller 208 in accordance with the operation signal. For example, a destination is set according to the instruction by operating the operating portion 202, the controller 208 searches for a most appropriate route from the vehicle position to the destination and displays the route with the map on the display portion 201 as a guiding route. Also, the audio guidance of the navigation is output from the speaker 206 by the control of the controller 208.

Here, when the navigation apparatus 200 is attached to the audio apparatus 100, the audio guidance of the navigation apparatus 200 is output from the speaker 113 connected to the audio apparatus 100.

In addition thereto, the controller 208 is capable of displaying the music information of the audio apparatus 100 on the display portion (main display) 201, by operating the operating portion 202 or 102.

The navigation apparatus 200 further includes: the charge circuit 210 that charges in the built-in battery 211, the power supplied by the control of the controller 106 of the audio apparatus 100; and the built-in battery 211 that supplies the power to the navigation apparatus 200, when the navigation apparatus 200 is removed from the audio apparatus 100 or when there is no power supplied from the in-vehicle battery 10.

The navigation apparatus 200 is also provided with: the wireless antenna 213; and the wireless communication sender/receiver 212, and is configured to acquire traffic information such as traffic congestion prediction or the like, from a center, not shown. The traffic information is used for selecting a route at the time of navigation.

It is also possible to utilize as a hands-free function, by receiving the sound on communication from a telephone to be communicated with and outputting the sound on communication from the microphone 103 in connection with the audio apparatus 100.

The audio apparatus 100 and the navigation apparatus 200 are connected by multiple signal lines such as a control line, a power line, and the like. The connector portion 300 has the connector 310 of the audio apparatus side and a connector 320 of the navigation apparatus side. When the connectors are in connection, the aforementioned multiple signal lines are connected.

Also, the connector portion 300 is provided with a detecting circuit 370 that detects whether or not the navigation apparatus 200 is connected to the connector portion 300. The configuration of the detecting circuit 370 is shown in FIG. 4.

Figure 4:
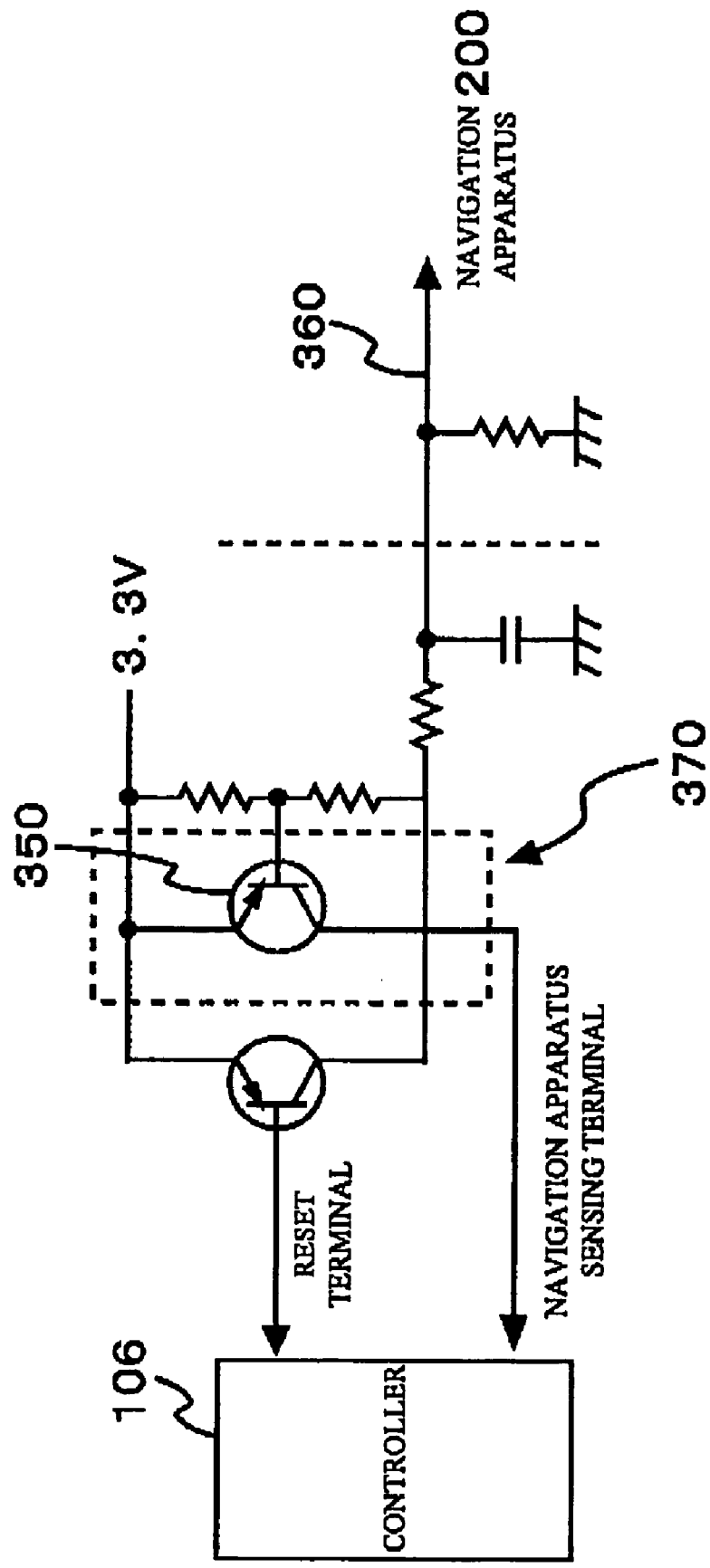
FIG. 4 shows a configuration of a detecting circuit.

A transistor 350 shown in FIG. 4 is off, while the navigation apparatus 200 is not in connection with a power line 360 supplying power to the navigation apparatus 200. For this reason, the voltage supplied to the controller 106 of the audio apparatus 100 is 0 V. When the navigation apparatus 200 is connected to the power line 360, the transistor 350 turns on and a voltage of 3.3 V is supplied to the controller 106 of the audio apparatus 100 from the power supply.

When an output voltage of a navigation apparatus sensing terminal connecting the transistor 350 and the controller 106 is 3.3 V, the controller 106 senses as a connected state. When the output voltage is 0 V, the controller 106 senses as an unconnected state.

As shown in FIG. 2A and FIG. 2B, the audio apparatus 100 further includes a removable switch (SW) 301. By pushing the removable switch 301, the navigation apparatus 200 is taken out of the front face panel 150 of the audio apparatus 100.

Figure 5A:
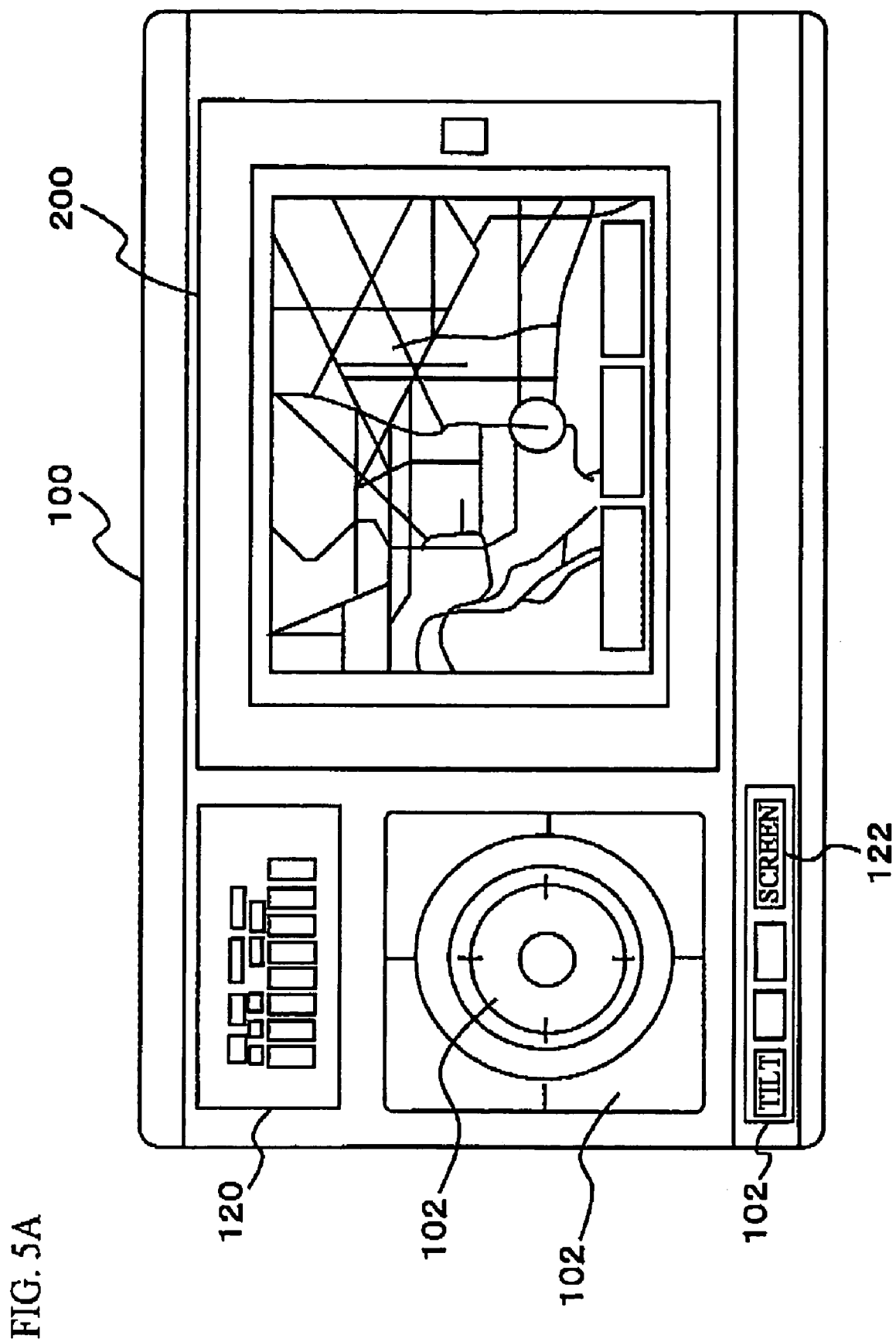
FIG. 5A is an example of displaying a navi screen on a display portion.
Figure 5B:
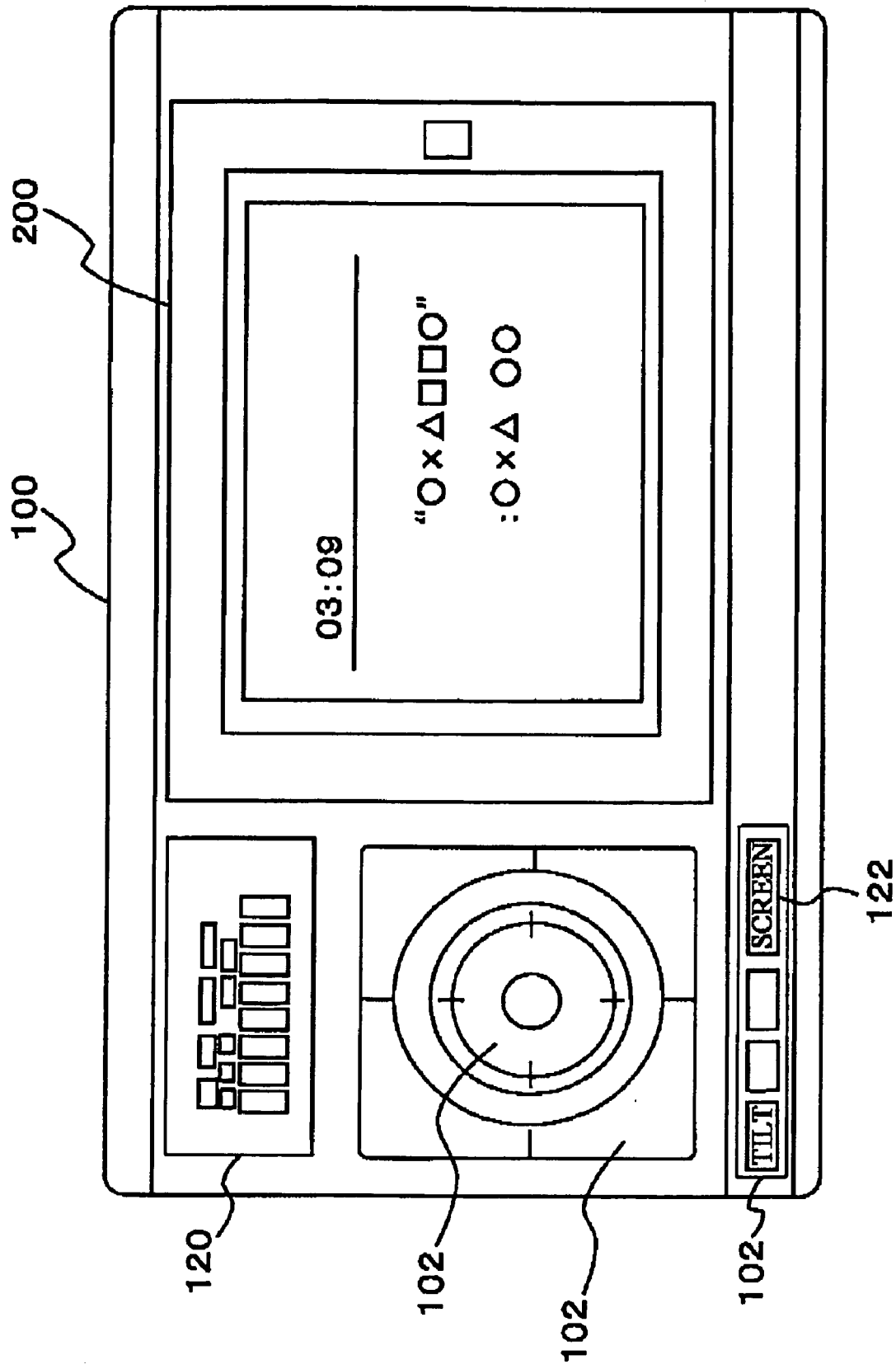
FIG. 5B is an example of displaying an audio screen on the display portion.

The front face panel 150 to be an operating face of the audio apparatus 100 is provided with the screen button 122 for switching between display information on the navigation apparatus 200 and the display information of the audio apparatus 100, to be displayed on the display screen of the navigation apparatus 200 (see FIG. 5A and FIG. 5B). The display information of the navigation apparatus 200 includes not only the map information or guiding path information for navigation but also information for operating the navigation apparatus 200 or the information received by the wireless communication sender/receiver 212. Hereinafter, the screen displaying the above-described information is referred to as Navi Screen.

The display information of the audio apparatus 100 includes the information on music data to be reproduced by the audio apparatus, the operation screen of the radio, the screen for volume operation, sound quality operation screen, and the like. Hereinafter, the screen displaying the above-described information is referred to as audio screen. FIG. 5A is an example of displaying Navi Screen on the display portion 201 of the navigation apparatus 200, and FIG. 5B is an example of displaying an audio screen on the display portion 201 of the navigation apparatus 200.

When the navigation apparatus 200 is attached to the audio apparatus 100, the audio screen and Navi Screen can be changed by pushing the screen button 122 for a short period of time. The display on the display portion 201 can be turned off by pushing for more than a given period of time, and can be turned on by pushing the screen button 122 again.

At this time, the controller 106 of the audio apparatus 100 sends an instruction to the navigation apparatus 200 according to the operation of the screen button 122. The navigation apparatus 200 changes the display of the display portion 201 according to the control of the controller 106 of the audio apparatus 100.

Also, even when the display of the display portion 201 is off, it is possible to output the audio guidance of the navigation apparatus 200 or play by the audio apparatus 100 continuously.

The controller 106 of the audio apparatus 100 turns off the display of the display portion 201 that has been off, when the screen button 122 is pushed, when it is detected that the navigation apparatus 200 is removed from the audio apparatus 100, or when a hands-free telephone call is received via the wireless communication sender/receiver 212.

In addition, when the display of the display portion 201 is turned on, Navi Screen may be displayed on the display portion 201 at first. Specifically, Navi Screen is to be displayed in the beginning, when the audio apparatus 100 is powered on, or when there is an operation on the screen button 122. A user is able to recognize the vehicle location on a map, just after getting in the vehicle. Furthermore, as soon as the audio and navigation system is powered on, the map or the vehicle location can be checked.

In the present exemplary embodiment, in a system in which the navigation apparatus detachable from the audio apparatus, an object is to improve user-friendliness. For this reason, when the controller 106 of the audio apparatus 100 detects the connection of the navigation apparatus 200 with the detecting circuit 370, the controller 106 causes the controller 208 of the navigation apparatus 200 to display the display information of navigation.

Also, when a destination is set in the navigation apparatus 200 and the map information or the guiding path to the destination is displayed, the navigation apparatus 200 causes the map information or the guiding path information to be displayed continuously after the audio apparatus 100 is attached.

Figure 6:
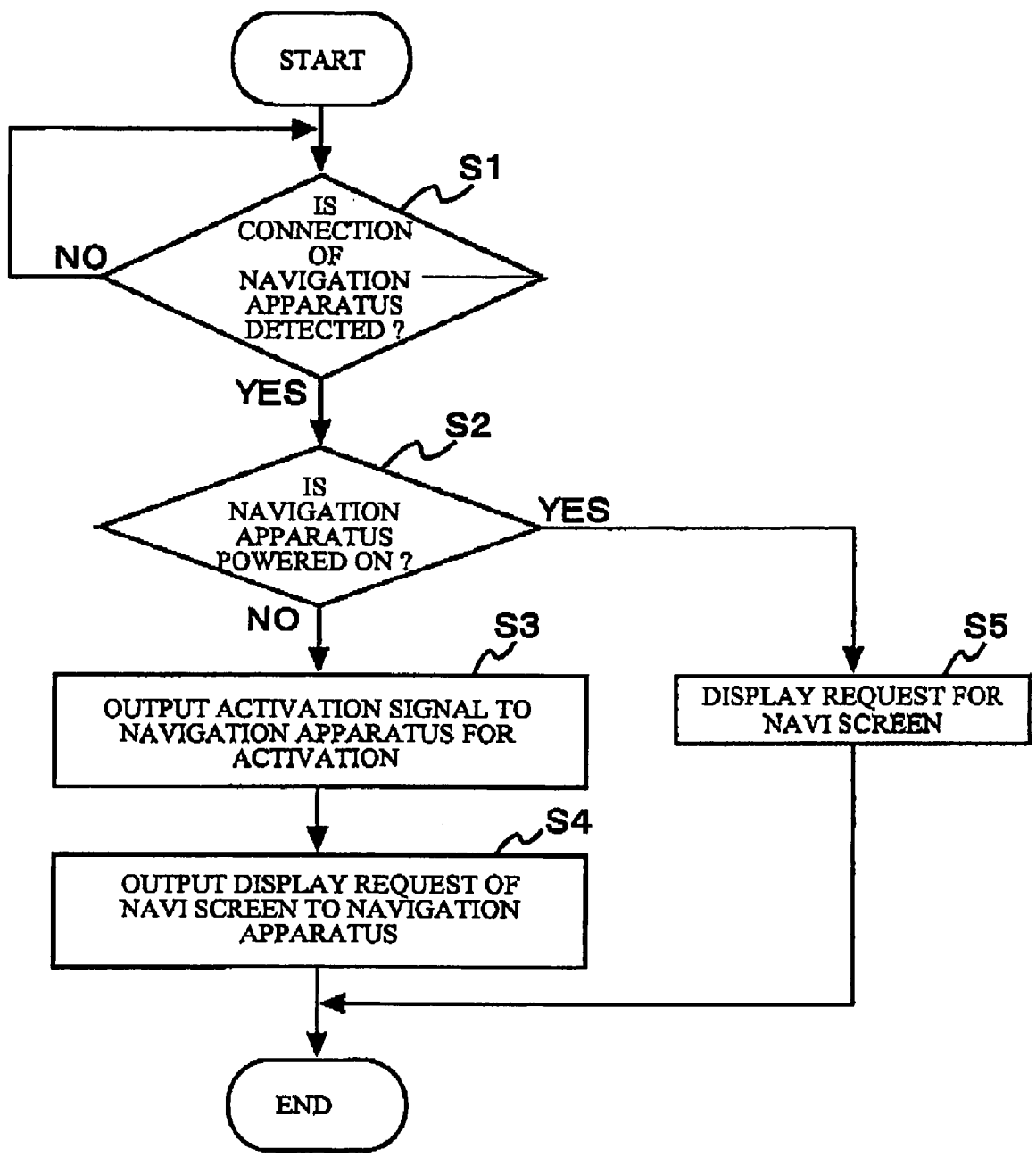
FIG. 6 is a flowchart showing a procedure of a controller of the audio apparatus when the navigation apparatus is attached to the audio apparatus.

Referring to the flowchart shown in FIG. 6, a description will be given of a procedure of the controller 106 of the audio apparatus 100 when the connection of the navigation apparatus 200 is detected.

When the controller 106 of the audio apparatus 100 detects the connection of the navigation apparatus 200 (step S1), the controller 106 determines whether or not the navigation apparatus 200 is powered on (step S2). The controller 106 of the audio apparatus 100 determines whether or not the communication with the controller 20B of the navigation apparatus 200 is enabled so as to determine whether or not the navigation apparatus 200 is powered on.

If the navigation apparatus 200 is powered on (step S2/YES), the controller 106 outputs a display request of Navi Screen to the controller 208 of the navigation apparatus 200 (step S5).

If the navigation apparatus 200 is not powered on (step S2/NO), the controller 106 outputs an activation signal to the navigation apparatus 200 to activate the navigation apparatus 200 (step S3), and outputs the display request of Navi Screen (step S4).

Figure 7:
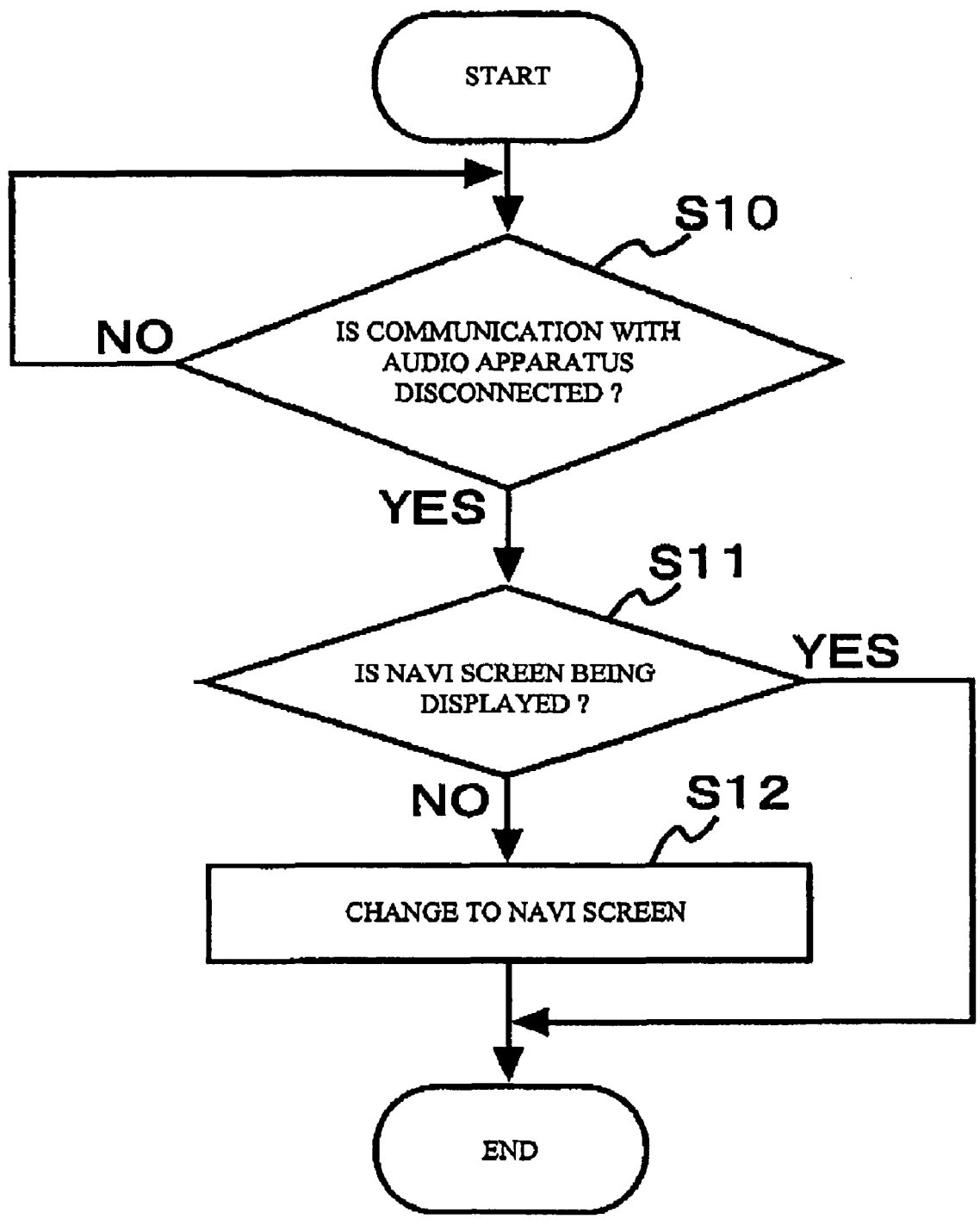
FIG. 7 is a flowchart showing a procedure of a controller of the navigation apparatus when the navigation apparatus is detached from the audio apparatus.

Next, a description will be given of a procedure of the controller 208 of the navigation apparatus 200 when the navigation apparatus 200 is detached from the audio apparatus 100, with reference to the flowchart shown in FIG. 7.

If the communication with the audio apparatus 100 is disconnected, the controller 208 of the navigation apparatus 200 detects that the navigation apparatus 200 is detached from the audio apparatus 100 (step S10). If the detachment from the audio apparatus 100 is detected (step S10/YES), the controller 208 of the navigation apparatus 200 determines whether or not Navi Screen is being displayed on the display portion 201 (step S11). If Navi Screen is not being displayed (step S11/NO), the display is changed to Navi Screen (step S12).

Figure 8:
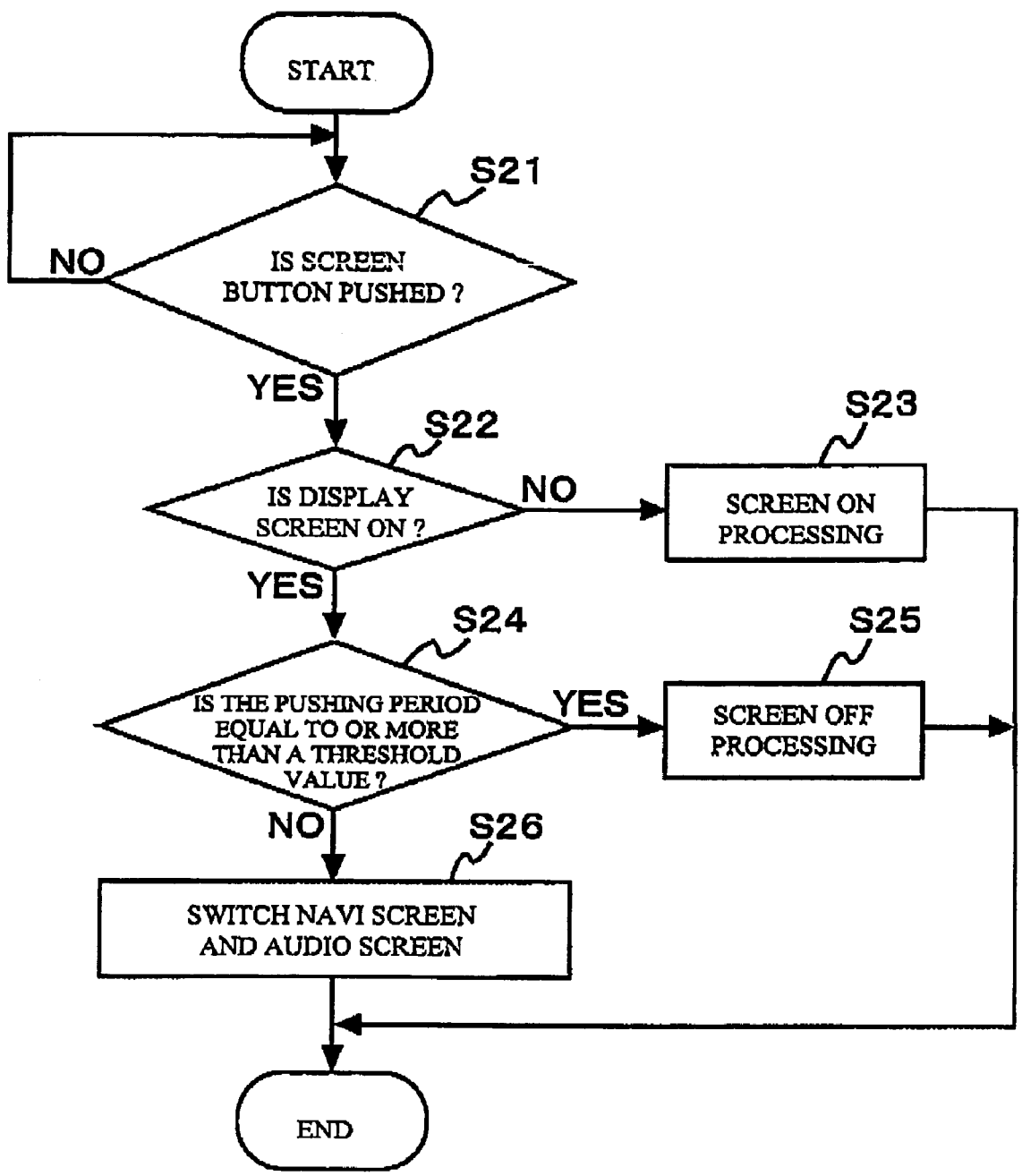
FIG. 8 is a flowchart showing a control procedure of the controller of the audio apparatus by means of a button operation of a screen button.

Next, a description will be given of a control procedure for changing the display screen by means of the operation of the screen button 122, with reference to the flowchart shown in FIG. 8.

When the screen button 122 is pushed (step S21), the controller 106 of the audio apparatus inquires of the controller 208 of the navigation apparatus 200 whether or not an image is being displayed on a display portion 220 (step S22). If the image is not displayed on the display portion 201 (step S22/NO), a request for turning on the display on the display portion 201 is output to the controller 208 of the navigation apparatus 200. If the image is being displayed on the display portion 201 (step S22/YES), it is determined whether or not the period of time while the screen button 122 is being pushed exceeds a threshold value (step S24). If the period of time while the screen button 122 is being pushed does not exceed the threshold value (step S24/NO), a request for turning off the screen display is output to the controller 208 of the navigation apparatus 200 (step S25). Also, if the period of time while the screen button 122 is being pushed exceeds the threshold value (step S24/YES), a request for switching between Navi Screen and the audio screen is output to the controller 208 of the navigation apparatus 200 (step S26).

In the present exemplary embodiment, when the navigation apparatus 200 is attached to the audio apparatus 100, the display information of the navigation apparatus is displayed on the display portion 201 of the audio apparatus 100. Accordingly, a user who uses the navigation apparatus is able to start the operation of the navigation apparatus, as soon as the user gets in a vehicle, whereby the user friendliness can be improved.

The controller 208 of the navigation apparatus 200 causes the display portion 201 to continuously display the information on the guiding path that has been displayed on the display portion 201 before the attachment to the audio apparatus 100, after the navigation apparatus 200 is attached to the audio apparatus 100. Therefore, it is possible to display the information on the guiding path after the navigation apparatus 200 is attached to the audio apparatus 100, thereby eliminating the necessity of setting the destination again.

Also, the controller 209 of the navigation apparatus 200 displays Navi Screen of the navigation apparatus 200 on the display portion 201, when detecting that the navigation apparatus 200 is detached from the audio apparatus 100. Accordingly, as soon as the navigation apparatus is removed from the audio apparatus, it is possible to start the operation of navigation.

In addition, in the above-described audio and navigation system 1, the controller 106 of the audio apparatus 100 functions as a main control apparatus; however, the controller 208 of the navigation apparatus 200 may function as the main control apparatus.

Although a few specific exemplary embodiments employed in the present invention have been shown and described, it would be appreciated by those skilled in the art that changes may be made in these exemplary embodiments without departing from the principles and spirit of the invention, the scope of which is defined in the claims and their equivalents.

What is claimed is:

1. An in-vehicle electronic system comprising:
    an in-vehicle electronic apparatus mounted in a vehicle; and
    a portable electronic apparatus detachably provided to the in-vehicle electronic apparatus,
    wherein:
    the in-vehicle electronic apparatus comprises:
    a detecting portion detecting an electrical connection of the portable electronic apparatus; and
    a first controller determining whether or not the portable electronic apparatus is powered on when detecting the electrical connection of the portable electronic apparatus, activating the portable electronic apparatus and requesting the portable electronic apparatus to display information of the portable electronic apparatus on a display portion of the portable electronic apparatus when the portable electronic apparatus is not powered on.

2. The in-vehicle electronic system as claimed in claim 1, wherein a second controller controlling the portable electronic apparatus continuously displays information of route guide that has been displayed on the display portion before the portable electronic apparatus is attached to the in-vehicle electronic apparatus, after the portable electronic apparatus is attached to the in-vehicle electronic apparatus.

3. The in-vehicle electronic system as claimed in claim 2, wherein the second controller causes the display portion to display display information of the portable electronic apparatus, when detecting that the portable electronic apparatus is removed from the in-vehicle electronic apparatus.

4. The in-vehicle electronic system as claimed in claim 1, wherein the in-vehicle electronic apparatus comprises a switch switching between a first display displaying display information of the portable electronic apparatus and a second display displaying the display information of the in-vehicle electronic apparatus, on the display portion, in a state where the portable electronic apparatus is attached.

5. The in-vehicle electronic system as claimed in claim 4, wherein the first controller turns off display of the display portion, when the switch is pushed continuously for more than a given period of time.

6. The in-vehicle electronic system as claimed in claim 1, wherein the first controller displays display information of the portable electronic apparatus on the display portion, when the in-vehicle electronic apparatus is powered on.

7. An in-vehicle electronic apparatus mounted in a vehicle and detachably provided with a portable electronic apparatus, the in-vehicle electronic apparatus comprising:
    a detecting portion detecting an electrical connection of the portable electronic apparatus; and
    a first controller determining whether or not the portable electronic apparatus is powered on when detecting the electrical connection of the portable electronic apparatus, activating the portable electronic apparatus and requesting the portable electronic apparatus to display display information of the portable electronic apparatus on a display portion of the portable electronic apparatus when the portable electronic apparatus is not powered on.

* * * * *